(12) United States Patent
Sano

(10) Patent No.: US 12,386,452 B2
(45) Date of Patent: Aug. 12, 2025

(54) ELECTRONIC DEVICE

(71) Applicant: Magnolia White Corporation, Tokyo (JP)

(72) Inventor: Takumi Sano, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 128 days.

(21) Appl. No.: 18/351,517

(22) Filed: Jul. 13, 2023

(65) Prior Publication Data
US 2024/0019954 A1  Jan. 18, 2024

(30) Foreign Application Priority Data

Jul. 13, 2022 (JP) ................................. 2022-112240

(51) Int. Cl.
*G06F 3/041* (2006.01)
*G01L 1/20* (2006.01)
*G06F 3/044* (2006.01)

(52) U.S. Cl.
CPC .......... *G06F 3/04146* (2019.05); *G01L 1/205* (2013.01); *G06F 3/0412* (2013.01); *G06F 3/0443* (2019.05); *G06F 2203/04105* (2013.01)

(58) Field of Classification Search
CPC .. G06F 3/04146; G06F 3/0443; G06F 3/0412; G06F 2203/04105; G01L 1/205

USPC .......................................................... 174/261
See application file for complete search history.

(56) References Cited

U.S. PATENT DOCUMENTS

| | | | |
|---|---|---|---|
| 2016/0005511 A1* | 1/2016 | Gravermann | H01B 7/17 29/829 |
| 2020/0042141 A1* | 2/2020 | Kwon | G06F 3/0446 |
| 2023/0041550 A1 | 2/2023 | Katsuhara et al. | |

FOREIGN PATENT DOCUMENTS

WO     2021/140967 A1     7/2021

* cited by examiner

*Primary Examiner* — Andargie M Aychillhum
(74) *Attorney, Agent, or Firm* — XSENSUS LLP

(57) ABSTRACT

According to one embodiment, an electronic device includes a first substrate, a second substrate opposing the first substrate, a pressure sensitive layer disposed between the first substrate and the second substrate, and an elastic member that covers the first substrate, the second substrate and the pressure sensitive layer. The first and second substrates include a first and second insulating substrates formed into a mesh-like shape. The elastic member includes slits that are formed around a first island-shaped portion of the first insulating substrate and a second island-shaped portion of the second insulating substrate. The slits open when the elastic member is expanded.

5 Claims, 8 Drawing Sheets

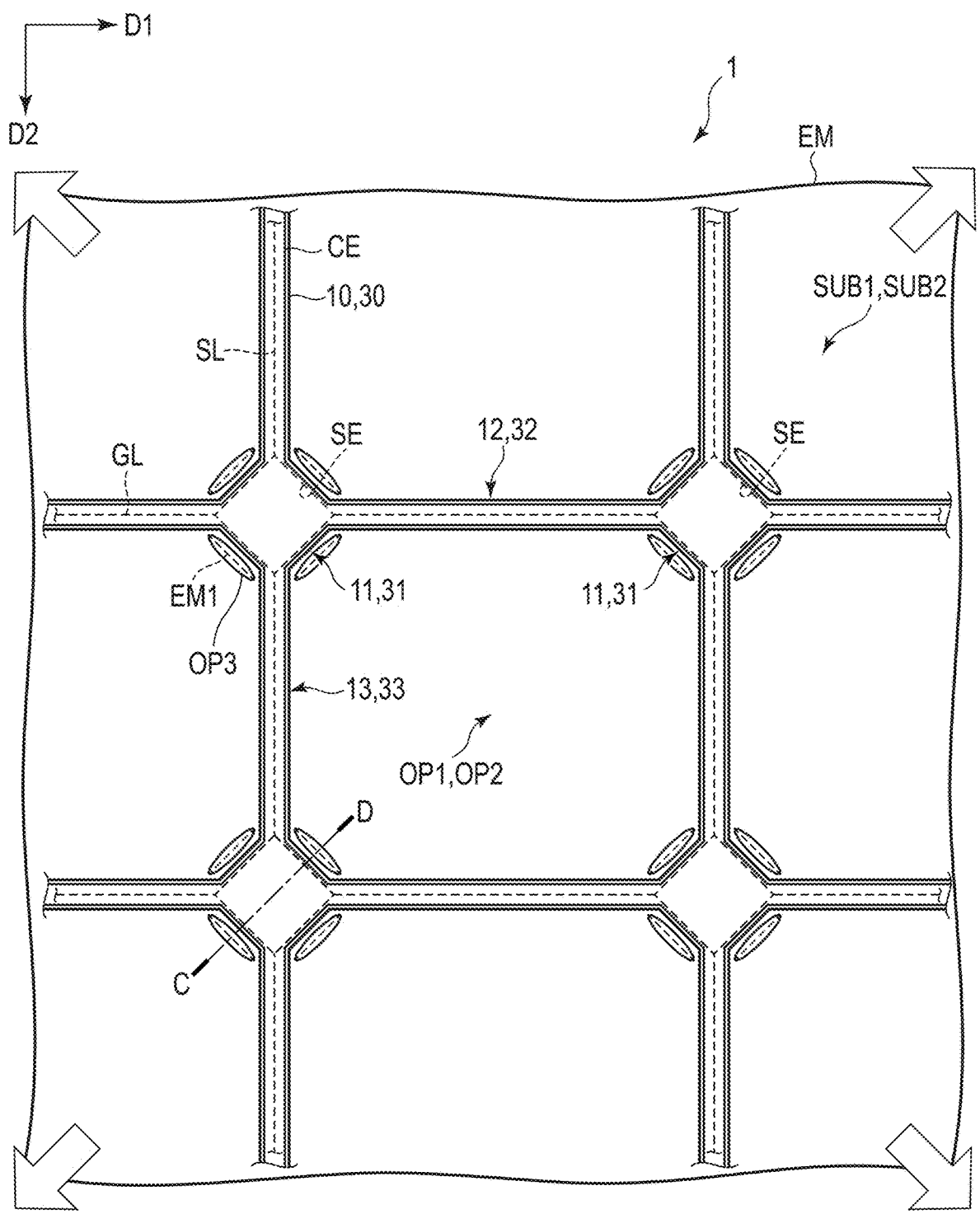
F I G. 6

ELECTRONIC DEVICE

CROSS-REFERENCE TO RELATED APPLICATIONS

This application is based upon and claims the benefit of priority from Japanese Patent Application No. 2022-112240, filed Jul. 13, 2022, the entire contents of which are incorporated herein by reference.

FIELD

Embodiments described herein relate generally to an electronic device.

BACKGROUND

In recent years, the use of flexible substrates with flexibility and elasticity has been considered in various fields. To cite one example, such a use can be considered that a flexible substrate on which sensor elements are arrayed in a matrix can be attached to a curved surface of a housing of an electronic device or the human body, etc.

However, in sensing by sensor elements mounted on such a flexible substrate, errors may occur before and after the flexible substrate expands or contracts.

BRIEF DESCRIPTION OF THE DRAWINGS

FIG. 6 is an enlarged plan view of a portion of the electronic device after expansion.

DETAILED DESCRIPTION

Figure 1:
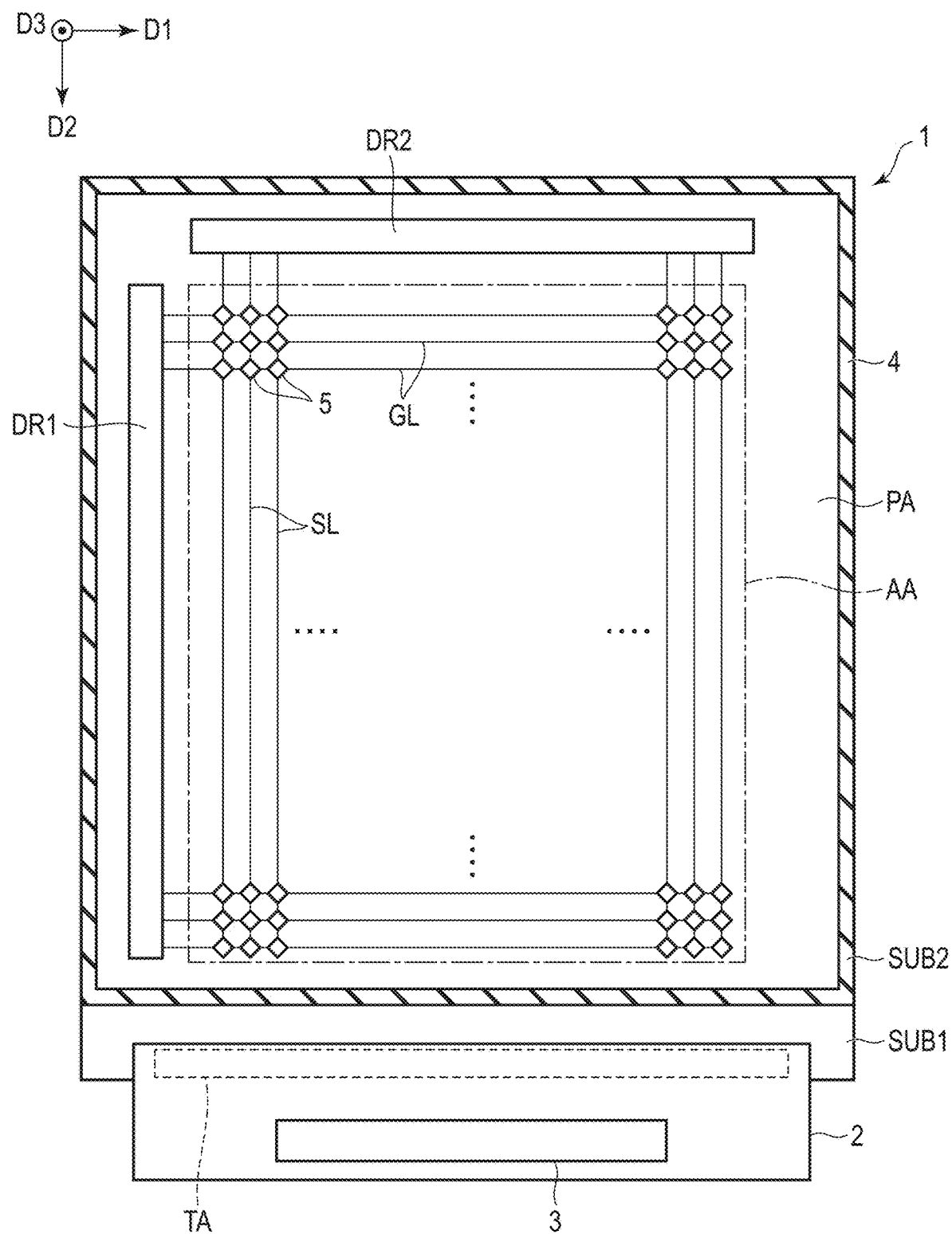
FIG. 1 is a plan view schematically showing an electronic device according to the first embodiment.

In general, according to one embodiment, an electronic device comprises a first substrate, a second substrate opposing the first substrate, a pressure sensitive layer disposed between the first substrate and the second substrate, and an elastic member that covers the first substrate, the second substrate and the pressure sensitive layer. The first substrate comprises a first insulating substrate, a wiring line and a sensor electrode. The first insulating substrate includes a plurality of first island-shaped portions and a plurality of first strip-shaped portions each connecting a respective adjacent pair of first island-shaped portions, and is formed into a mesh-like shape. The wiring line is disposed on the first strip-shaped portion. The sensor electrode is disposed on the first island-shaped portion and is electrically connected to the wiring line. The second substrate comprises a second insulating substrate and a common electrode. The second insulating substrate includes a plurality of second island-shaped portions and a plurality of second strip-shaped portions each connecting a respective adjacent pair of second island-shaped portions, and is formed into a mesh-like shape. The common electrode is disposed under the second island-shaped portions and the second strip-shaped portions, and is formed in a mesh-like shape. The elastic member includes slits that are formed around the first island-shaped portion and the second island-shaped portion and that open when the elastic member is expanded.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view schematically showing an electronic device 1 of the first embodiment. In this embodiment, a first direction D1, a second direction D2 and a third direction D3 are defined as shown in the figure. The first direction D1 and the second direction D2 are parallel to the main surface of the electronic device 1 and intersect each other. The third direction D3 is perpendicular to the first and second directions D1 and D2, and corresponds to the thickness direction of the electronic device 1. The first direction D1 and the second direction D2 intersect perpendicularly in this embodiment, but may intersect at an angle other than perpendicularly. In this specification, the direction toward the tip of the arrow indicating the third direction D3 is referred to as "up" and the direction from the tip of the arrow to the opposite direction is referred to as "down". It is assumed that there is an observation position to observe the electronic device 1 on the tip side of the arrow indicating the third direction D3, and viewing the D1-D2 plane defined by the first direction D1 and the second direction D2 from this observation position is called a plan view.

The electronic device 1 is a pressure sensor and, as shown in FIG. 1, comprises a first substrate SUB1, a second substrate SUB2, a circuit board 2 and a controller 3. The circuit board 2 is a flexible printed circuit board, for example, and is electrically connected to each terminal in a terminal area TA of the first substrate SUB1. The controller 3 is mounted on the circuit board 2, but may as well be mounted on the first substrate SUB1. The first substrate SUB1 and the second substrate SUB2 are adhered together by an outer circumferential seal 4. The first substrate SUB1 and the second substrate SUB2 are flexible and elastic.

As shown in FIG. 1, the electronic device 1 includes an active area AA and a frame-like peripheral area PA surrounding the active area AA. The active area AA is an area where sensor elements, which will be described later, are disposed and may be referred to as a sensing area. The peripheral area PA is an area where peripheral circuits such as various types of drivers and the like, which will be described later, are disposed.

As shown in FIG. 1, the electronic device 1 further comprises a plurality of scanning lines GL, a plurality of signal lines SL, a plurality of sensor elements 5, a scanning line driver DR1, a signal line driver DR2 and the like. The scanning lines GL, the signal lines SL and the sensor elements 5 are arranged in the active area AA, whereas the scanning line driver DR1 and the signal line driver DR2 are arranged in the peripheral area PA. The scanning lines GL each extend along the first direction D1 and are aligned along the second direction D2. The scanning lines GL are each connected to the scanning line driver DR1. The signal lines SL each extend along the second direction D2 and are aligned along the first direction D1. The signal lines SL are each connected to the signal line driver DR2. The sensor elements 5 are each located at the respective intersection of a respective scanning line GL and a respective signal line SL, and are electrically connected to the scanning line GL and the signal line SL, respectively. Specific configuration examples of the sensor elements 5 will be provided later.

Figure 2:
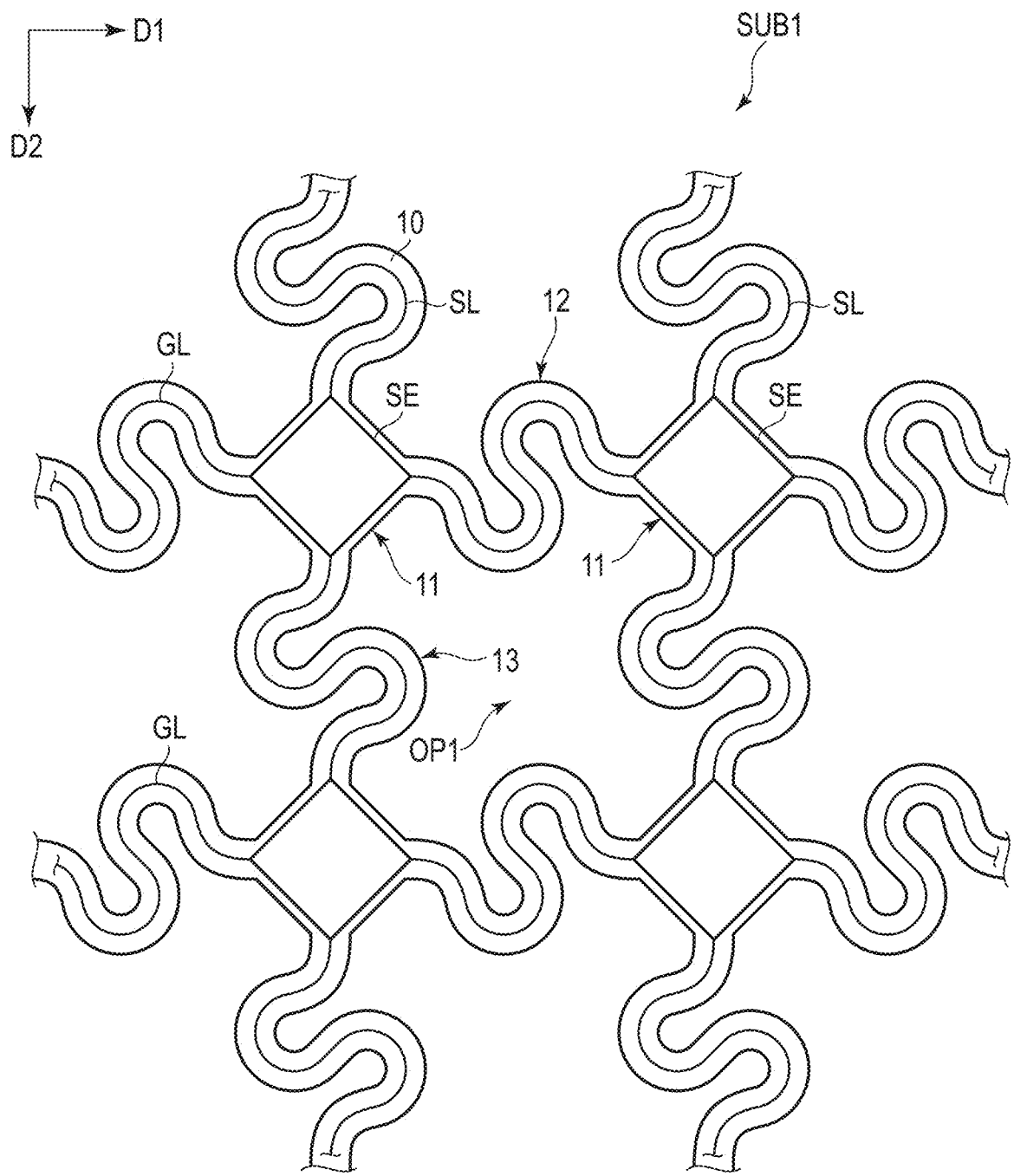
FIG. 2 is an enlarged plan view of a part of a first substrate shown in FIG. 1.

FIG. 2 is an enlarged plan view of a part of the first substrate SUB1 (the active area AA) shown in FIG. 1. The first substrate SUB1 comprises an insulating base 10 (a first insulating base) that supports the scanning lines GL and the signal lines SL, and sensor electrodes SE that constitute the sensor elements 5, respectively.

The insulating base 10 comprises a plurality of body portions 11 (first island-shaped portions) and hinge portions 12 and 13 (first strip-shaped portions) formed to be integrated with the body portions 11, respectively, and is formed in a mesh-like form with apertures OP1. The insulating base 10 is flexible and can be formed of polyimide, for example, but the material is not limited to that of this example.

The body portions 11 are arranged in a matrix so as to be spaced apart from each other along the first direction D1 and the second direction D2. Each of the body portions 11 is formed into a rectangular (rhombic) shape, for example, in plan view. Note that the body portions 11 may be formed into some other polygonal shape or circular or elliptical shape.

The hinge portions 12 extend substantially along the first direction D1 and are aligned along the second direction D2. The hinge portions 12 each connect a plurality of body portions 11 aligned along the first direction D1. The hinge portions 13 extend substantially along the second direction D2 and are aligned along the first direction D1. The hinge portions 13 each connect a plurality of body portions 11 aligned along the second direction D2. The hinge portions 12 and 13 are each formed into a wavy (meander) shape in plan view.

The scan lines GL extend while overlapping the respective hinge portions 12. The signal lines SL extend while overlapping the respective hinge portions 13. That is, both the scanning lines GL and the signal lines SL are all formed into a wavy (meander) shape.

The scanning lines GL and the signal lines SL are electrically connected to the respective sensor electrodes SE via contact holes, which are not shown in the illustration.

Figure 3:
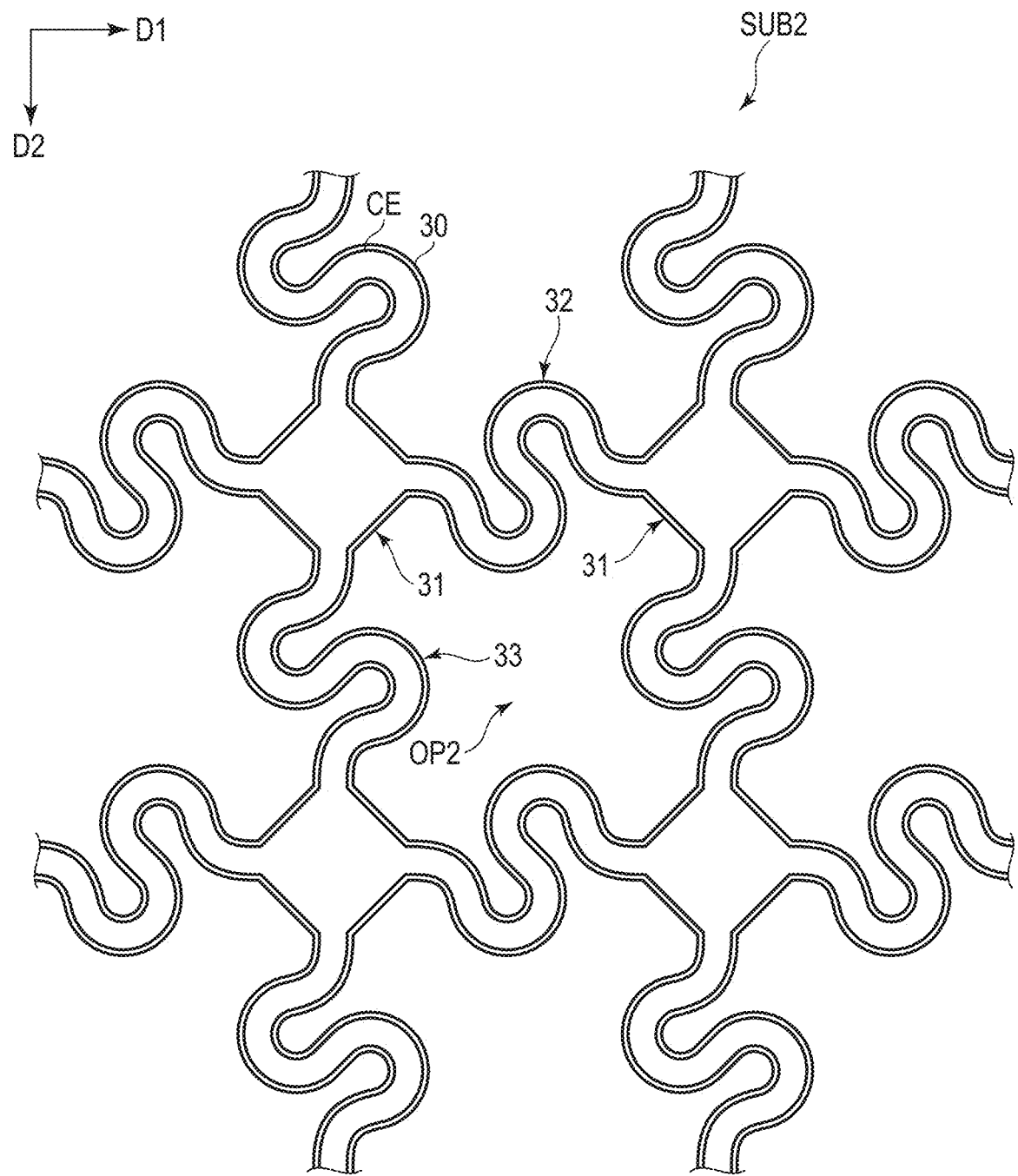
FIG. 3 is an enlarged plan view of a part of a second substrate shown in FIG. 1.

FIG. 3 is an enlarged plan view of a part of the second substrate SUB2 (active area AA) shown in FIG. 1. The second substrate SUB2 comprises a common electrode CE that constitute the sensor elements 5, and an insulating base 30 (second insulating base) supporting the common electrode CE.

The insulating base 30 comprises a plurality of body portions 31 (second island-shaped portions) and hinge portions 32 and 33 (second strip-shaped portions) formed to be integrated with the body portions 31, respectively, and is formed into a mesh-like form including apertures OP2. The insulating base 30 is flexible and can be formed of, for example, polyimide, polyethylene terephthalate, polydimethylsiloxane or the like, but not limited to these.

The body portions 31 are arranged in a matrix so as to be spaced apart from each other along the first direction D1 and the second direction D2. Each of the body portions 31 is formed into a rectangular (rhombic) shape, for example, in plan view. Note that, the body portions 31 may be formed in some other polygonal shape or circular or elliptical shape.

The hinge portions 32 extend substantially along the first direction D1 and are aligned along the second direction D2. The hinge portions 32 each connect a plurality of body portions 31 aligned along the first direction D1. The hinge portions 33 extends substantially along the second direction D2 and are aligned along the first direction D1. The hinge portions 33 each connect a plurality of body portions 31 aligned along the second direction D2. The hinge portions 32 and 33 are each formed into a wavy (meander) shape in plan view.

The body portions 31 have a shape similar to that of the body portions 11 of the insulating base 10 and overlap the body portions 11 respectively in plan view. The hinge portions 32 have a shape similar to that of the hinge portions 12 of the insulating base 10 and overlap the hinge portions 12 respectively in plan view. The hinge portions 33 have a shape similar to that of the hinge portions 13 of the insulating base 10 and overlap the hinge portions 13 respectively in plan view. The apertures OP2 of the insulating base 30 have a shape similar to that of the apertures OP1 of the insulating base 10 and overlap the apertures OP1, respectively in plan view.

The common electrode CE extends while overlapping the respective body portion 31 and the hinge portions 32 and 33. That is, the common electrode CE, as in the case of the insulating base 30 described above, is made into a mesh-like form including the apertures OP2.

Figure 4:
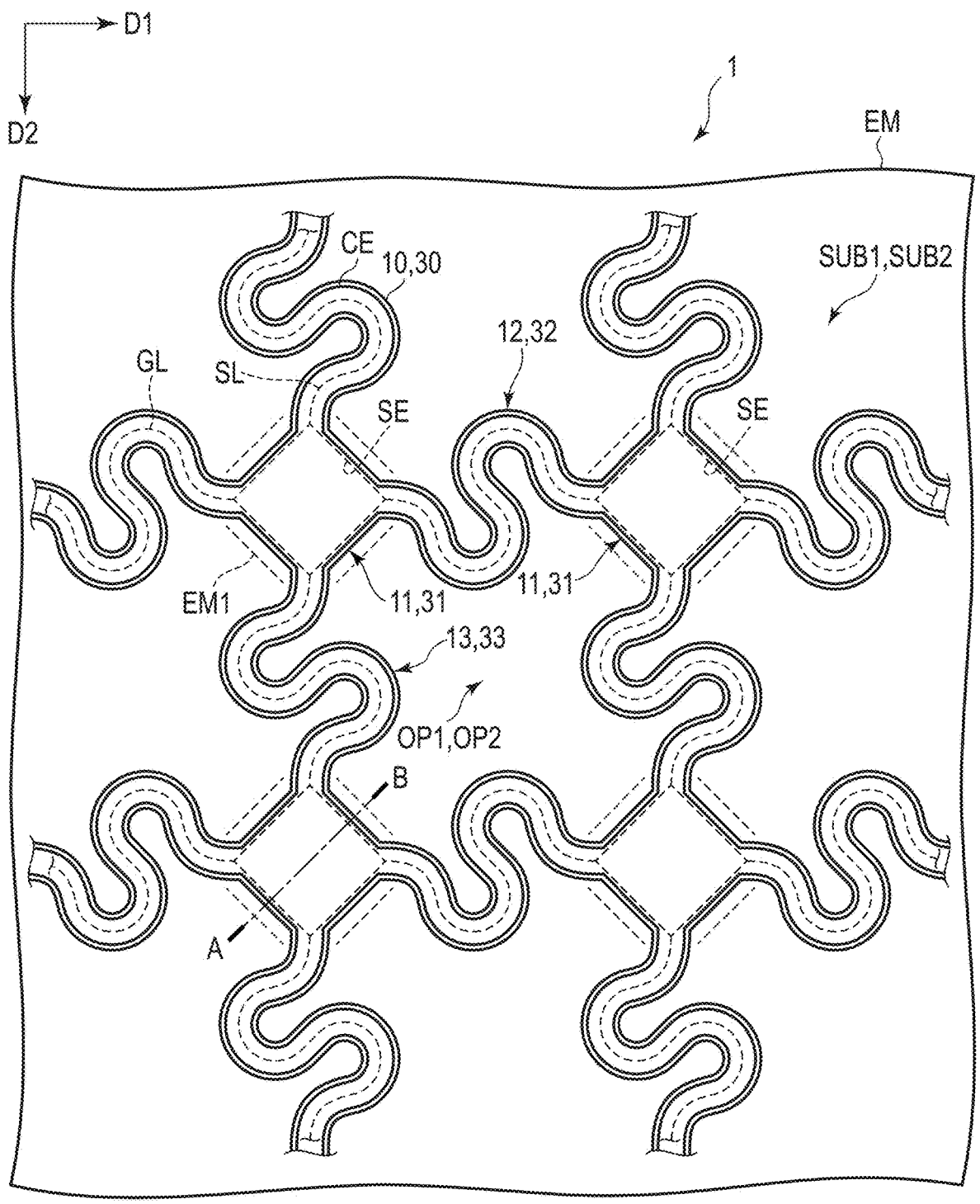
FIG. 4 is an enlarged plan view of a portion of the electronic device before expansion.

FIG. 4 is an enlarged plan view of a portion (an active area AA) of the electronic device 1 shown in FIG. 1, which illustrates the electronic device 1 before expansion (the electronic device 1 in a state where no tensile force is applied).

The electronic device 1 comprises, in addition to the first substrate SUB1 and the second substrate SUB2, an elastic member EM. The elastic member EM is disposed to cover the first substrate SUB1 and the second substrate SUB2, and the elastic member EM is filled into the apertures OP1 of the mesh-like insulating base 10 of the first substrate SUB1 and the apertures OP2 of the mesh-like insulating base 30 of the second substrate SUB2. In other words, the apertures OP1 of the insulating base 10 and the apertures OP2 of the insulating base 30 are embedded with the elastic member EM.

In the elastic member EM, slits EM1 are formed around each of the body portions 11 and 31. The slits EM1 are formed so as to penetrate from the upper surface to the lower surface of the elastic member EM. The slits EM1 are each formed along a respective side of each of the rectangular (rhombic) body portions 11 and 31, with four slits EM1 per body portion 11 and 31. The slits EM1 should desirably be each formed at a predetermined distance from the respective side (end portion) of each of the body portions 11 and 31. More specifically, the slits EM1 should be each formed at a distance of at least 10 µm from the respective side (end portion) of each of the body portions 11 and 31. FIG. 4 illustrates an example case where the slits EM1 are formed into a straight line, but the shape of the slits EM1 is not limited to this but can be formed into any shape (for example, wavy, triangular or the like).

Of the elements shown in FIG. 4, elements other than the elastic member EM have already been described with reference to FIGS. 2 and 3, and therefore a detailed description of these elements is omitted here.

Figure 5:
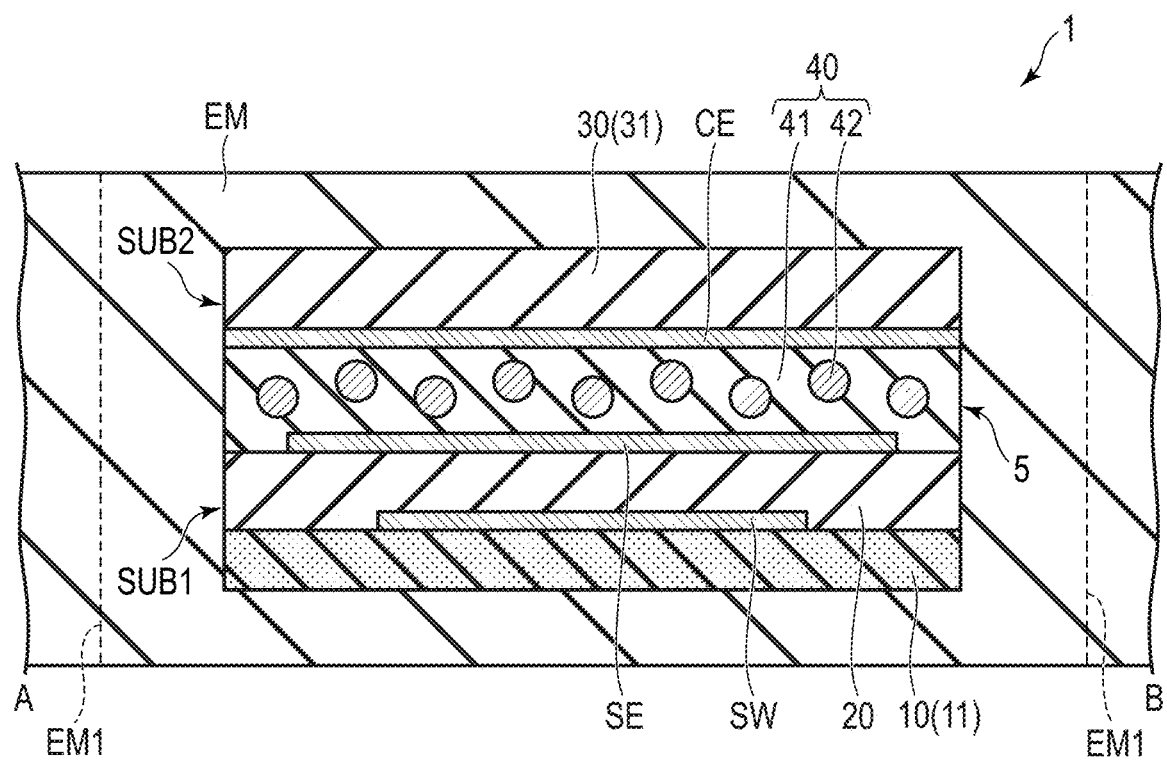
FIG. 5 is a cross-sectional view of the electronic device cut along line A-B in FIG. 4.

FIG. 5 is a cross-sectional view of the electronic device 1 cut along the A-B line in FIG. 4. Here, the configuration of the sensor element 5 will be mainly described.

As shown in FIG. 5, the sensor element 5 comprises a switching element SW, a sensor electrode SE, a common electrode CE, a pressure sensitive layer and the like.

First, the configuration on the first substrate SUB1 side will be described. The insulating base 10 has a film thickness of, for example, 10 μm. On the insulating base 10, the switching element SW is disposed. In FIG. 5, the switching element SW is shown in a simplified manner, but in reality, the switching element SW includes semiconductor layers and electrodes of each layer (for example, a gate electrode formed of a part of a scanning line GL, a source electrode formed of a part of a signal line SL, a drain electrode formed in the same layer as that of the signal line SL, and the like). On the insulating base 10 and the switching element SW, an insulating layer 20 is disposed. The insulating layer 20 is constituted by at least one or more insulating films and covers the switching element SW. On the insulating layer 20, a sensor electrode SE is disposed. The sensor electrode SE is disposed at a position overlapping the body portion 11 of the insulating base 10. The sensor electrode SE is formed of a transparent conductive material such as indium tin oxide (ITO) or indium zinc oxide (IZO). Although the illustration is omitted from FIG. 5, the switching element SW and the sensor electrode SE are electrically connected to each other via a contact hole.

Next, the configuration on the second substrate SUB2 side will be described. The insulating base 30 has a film thickness of, for example, 50 μm. Under the insulating base 30, a common electrode CE is disposed. The common electrode CE is disposed at a position overlapping the body portion 31 of the insulating base 30 and the hinge portions 32 and 33, which are not shown in FIG. 5. The common electrode CE is formed of an organic-based conductive material.

The pressure sensitive layer 40 is disposed between the first substrate SUB1 and the second substrate SUB2. The pressure sensitive layer 40 is disposed at least at a position overlapping the body portion 11 of the insulating base 10 and the body portion 31 of the insulating base 30. The pressure sensitive layer 40 includes an insulator 41 and conductive particles 42. When pressure is applied from the second substrate SUB2 side, the conductive particles 42 contained in the pressure sensitive layer are brought into contact with the sensor electrode SE and the common electrode CE. The electronic device 1 detects the change in contact resistance caused by the contacting of the conductive particles 42 with the sensor electrode SE and the common electrode CE, and measures the magnitude of the pressure applied to the electronic device 1.

The first substrate SUB1, the second substrate SUB2 and the pressure sensitive layer 40 are covered by the elastic member EM. With this configuration, the first substrate SUB1, the second substrate SUB2 and the pressure sensitive layer 40 can be fixed by the elastic member EM, and therefore it is possible to suppress the misalignment of the elements which constitute the sensor element 5 when pressure is applied from the second substrate SUB2 side.

As shown by the broken lines in FIG. 5, slits EM1 are each formed in the elastic member EM at a predetermined distance from the respective end portion of the body portion 11 and 31. Here, on the elastic member EM before expansion (in other words, the elastic member EM in the state where a tensile force is not being applied), a slight force acts in the direction of contraction, and therefore the slits EM1 are in a closed state and do not open, as shown in FIG. 5.

Figure 7:
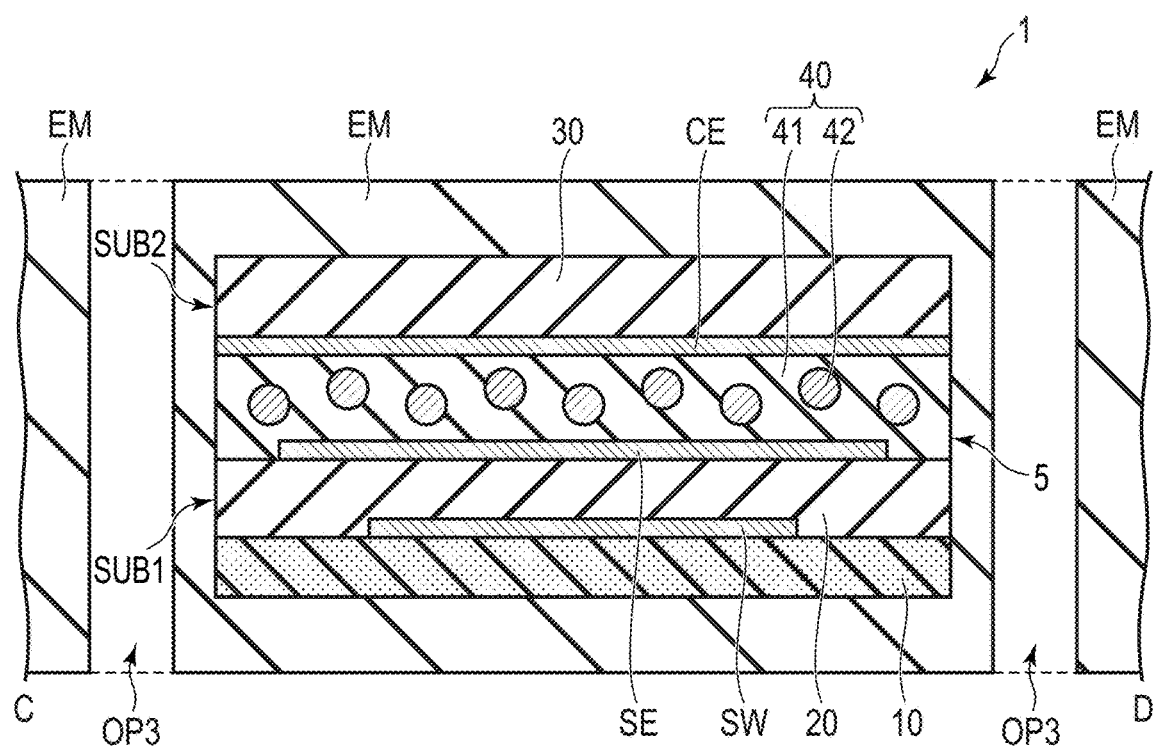
FIG. 7 is a cross-sectional view of the electronic device cut along line C-D in FIG. 6.

FIG. 6 is an enlarged plan view of a portion (an active area AA) of the electronic device 1 shown in FIG. 1, which illustrates the electronic device 1 after expansion (the electronic device 1 in a state where a tensile force is being applied). Further, FIG. 7 is a cross-sectional view of the electronic device 1 cut along the C-D line in FIG. 6.

In the electronic device 1 after expansion, the wavy-shaped hinges 12, 13, 32 and 33 are stretched out to be straight, as shown in FIG. 6. In the electronic device 1 after expansion, the slits EM1 formed in the elastic member EM open to form apertures OP3, respectively, as shown in FIGS. 6 and 7. As described above, the slits EM1 are each formed at a predetermined distance from the respective side (end portion) of each of the body portions 11 and 31 (specifically, at a distance of about 10 μm), and therefore the apertures OP3 are not brought into contact with (interfere with) the body portions 11 and 31. In other words, the slits EM1 should desirably be each formed at such a distance away from the body portions 11 and 31 by a distance that the apertures OP3 are not brought into contact with the body portions 11 and 31 when slits EM1 are opened to form the apertures OP3 during expansion of the elastic member EM.

When the slits EM1 are formed around the body portions 11 and 31 so that the apertures OP3 are formed during the expansion of the elastic member EM, the tensile force applied to the body portions 11 and 31 can be relaxed. With this configuration, the tensile force applied to the sensor element 5, which is disposed at a position overlapping the body portions 11 and 31, can be relaxed and therefore it is possible to suppress the change in the thickness of the pressure-sensitive layer 40, which constitutes the sensor element 5, before and after expansion or contraction. If the film thickness of the pressure-sensitive layer 40 changes before and after expansion or contraction, different magnitudes of pressure may be measured even though the same magnitude of pressure is applied before and after expansion or contraction. However, according to the configuration of this embodiment, as described above, it is possible to suppress the change in the thickness of the pressure-sensitive layer 40 before and after expansion or contraction, thus making it possible to improve the accuracy (reliability) of pressure measurement as compared to that of the configuration where the slits EM1 are not formed.

Figure 8:
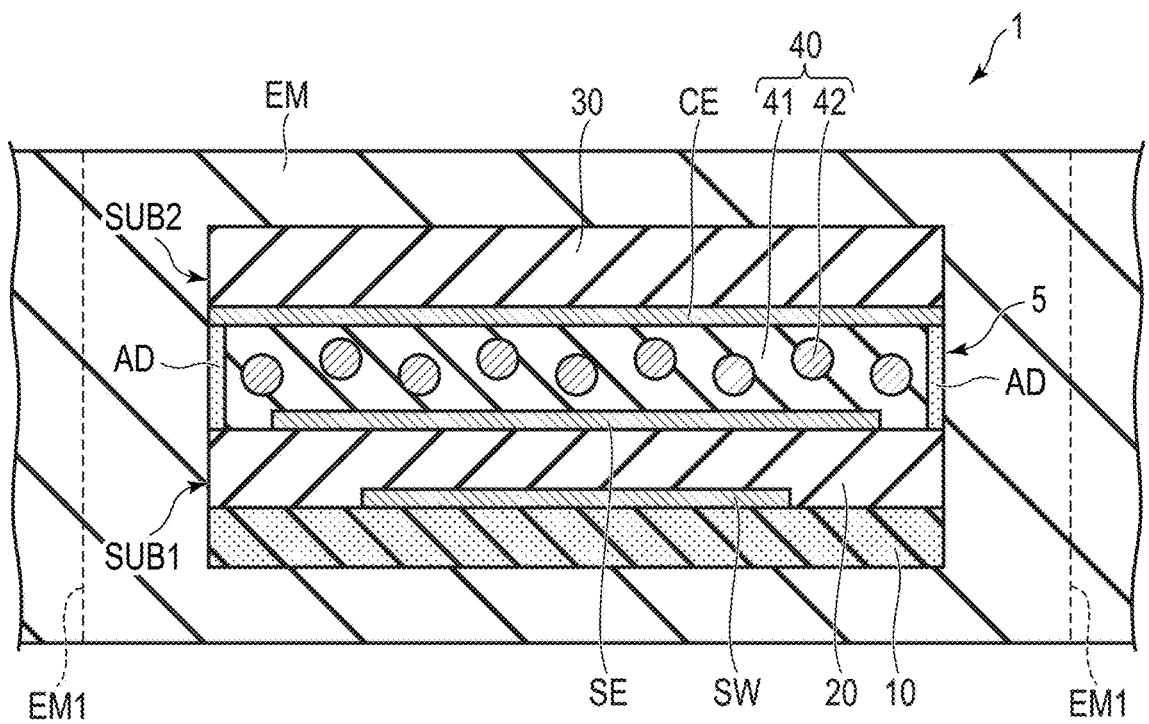
FIG. 8 is a cross-sectional view showing another configuration of the electronic device of the embodiment.

In contrast to the configuration described above, the electronic device 1 may further comprise an adhesive layer AD that adheres the configuration on the first substrate SUB1 side and the configuration on the second substrate SUB2 side together and seals the pressure sensitive layer 40, as shown in FIG. 8. The adhesive layer AD is disposed in a position overlapping the outer peripheries of the body portion 11 of the insulating base 10 and the body portion 31 of the insulating base 30, as shown in FIG. 8. Even with this configuration, the technical point remains the same that slits EM1 are formed around the body portions 11 and 31, and therefore advantageous effects similar those described above can be obtained.

Figure 9:
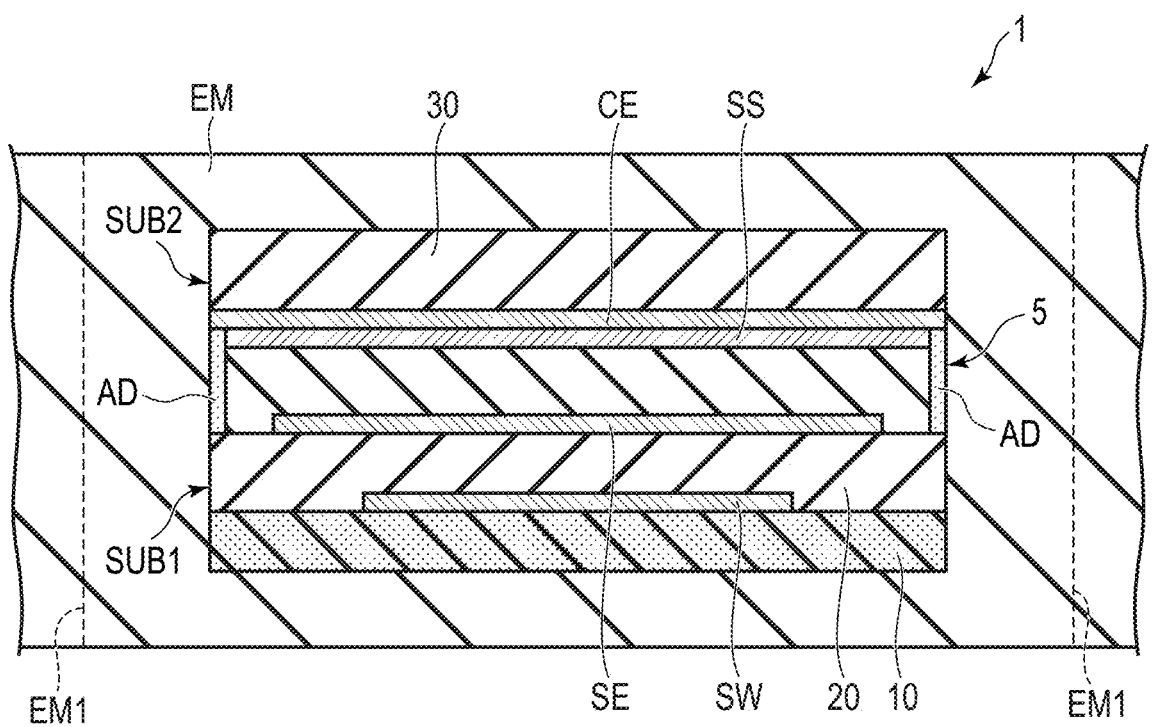
FIG. 9 is a cross-sectional view showing still another configuration example of the electronic device of the embodiment.

In this embodiment, the configuration in which the sensor element 5 comprises a pressure-sensitive layer 40 is described as an example, but the configuration is not limited to that of this example. For example, as shown in FIG. 9, the sensor element 5 may be of a configuration comprising a sensor sheet SS in place of the pressure sensitive layer 40. The sensor sheet SS is placed under the common electrode CE as a configuration on the second substrate SUB2 side and opposes the sensor electrode SE. The configuration on the second substrate SUB2 side including the sensor sheet SS and the configuration on the first substrate SUB1 side are adhered together by the adhesive layer AD. Between the sensor sheet SS and the sensor electrode SE, a gap is provided, and when pressure is applied from the second substrate SUB2 side, the sensor sheet SS is brought into contact with the sensor electrode SE. The electronic device 1 detects the change in contact resistance caused by the contacting of the sensor sheet SS with the sensor electrode SE and measures the pressure applied to the electronic device 1. Even with this configuration, the technical point remains the same that slits EM1 are formed around the body portions 11 and 31, and therefore advantageous effects similar those described above can be obtained.

The present embodiment provided above is described on the assumption that the hinge portions 12 and 13 of the insulating base 10, the scanning lines GL and signal lines SL, the hinge portions 32 and 33 of the insulating base 30, and the common electrode CE are all formed into wavy shapes. But these may be formed into zigzag line shapes or into curvature shapes obtained by combining a plurality of curves of different curvatures together.

Furthermore, the embodiment provided above is described on the assumption that the common electrode CE is disposed on the second substrate SUB2 side, but the common electrode CE may be disposed on the first substrate SUB1 side. In this case, in consideration of the manufacturing steps, the common electrode CE should desirably formed in the same layer as that of the sensor electrode SE and of the same material thereof. Further, here, in consideration of the manufacturing steps, the common electrode CE is placed only at the position overlapping the respective body portion 11 and not at the position overlapping the respective hinge portion 12 and the respective hinge portion 13 or in the respective aperture OP1.

According to the embodiment described above, it is possible to provide an electronic device 1 with an improved reliability of sensing by a sensor element mounted on the first substrate SUB1 and the second substrate SUB2 having elasticity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising: a first substrate; a second substrate opposing the first substrate; a pressure sensitive layer disposed between the first substrate and the second substrate; and an elastic member that covers the first substrate, the second substrate and the pressure sensitive layer, wherein the first substrate comprises: a first insulating substrate including a plurality of first island-shaped portions and a plurality of first strip-shaped portions each connecting a respective adjacent pair of first island-shaped portions, and formed into a mesh-like shape; a wiring line disposed on the first strip-shaped portion; and a sensor electrode disposed on the first island-shaped portion and electrically connected to the wiring line, the second substrate comprises: a second insulating substrate including a plurality of second island-shaped portions and a plurality of second strip-shaped portions each connecting a respective adjacent pair of second island-shaped portions, and formed into a mesh-like shape; and a common electrode disposed under the second island-shaped portions and the second strip-shaped portions, and formed in a mesh-like shape, and the elastic member includes slits that are formed around the first island-shaped portion and the second island-shaped portion and that open when the elastic member is expanded, wherein the first island-shaped portion and the second island-shaped portion are each formed in a rectangular shape and respectively overlap each other in plan view, and the slits are each formed at a predetermined distance from a respective side of each of the first island-shaped portion and the second island-shaped portion, into a straight line along each respective side thereof.

2. The electronic device of claim 1, wherein
the slits are each formed at a predetermined distance from a respective end portion of each of the first island-shaped portion and the second island-shaped portion.

3. The electronic device of claim 2, wherein
the slits are each formed at such a distance away from the respective end portion of each of the first island-shaped portion and the second island-shaped portion by a distance that the slits are not brought into contact with the first island-shaped portion and the second island-shaped portion when the slits are opened during expansion of the elastic member.

4. The electronic device of claim 3, wherein
the slits are each formed at a distance of at least 10 μm from the respective end portion of each of the first island-shaped portion and the second island-shaped portion.

5. The electronic device of claim 1, further comprising an adhesive layer disposed at a position overlapping an outer periphery of the first island-shaped portion and the second island-shaped portion in plan view, which bonds the first substrate and the second substrate to each other.

* * * * *